(12) United States Patent
Yamamoto et al.

(10) Patent No.: US 8,587,527 B2
(45) Date of Patent: Nov. 19, 2013

(54) COORDINATE INPUT DEVICE

(75) Inventors: Sadao Yamamoto, Koshigaya (JP); Naoto Onoda, Chiba (JP)

(73) Assignee: Wacom Co., Ltd, Saitama-Ken (JP)

( * ) Notice: Subject to any disclaimer, the term of this patent is extended or adjusted under 35 U.S.C. 154(b) by 757 days.

(21) Appl. No.: 11/951,368

(22) Filed: Dec. 6, 2007

(65) Prior Publication Data
US 2008/0142280 A1 Jun. 19, 2008

(30) Foreign Application Priority Data

Dec. 13, 2006 (JP) ................ P2006-336029

(51) Int. Cl.
*G06F 3/041* (2006.01)
*G06F 3/033* (2013.01)

(52) U.S. Cl.
USPC ........................................ 345/173; 345/179

(58) Field of Classification Search
USPC ............................................. 345/173, 179
See application file for complete search history.

(56) References Cited

U.S. PATENT DOCUMENTS

| | | | | |
|---|---|---|---|---|
| 5,402,151 A | * | 3/1995 | Duwaer | 345/173 |
| 5,510,813 A | * | 4/1996 | Makinwa et al. | 345/173 |
| 5,670,755 A | * | 9/1997 | Kwon | 178/18.05 |
| 5,956,020 A | * | 9/1999 | D'Amico et al. | 345/173 |
| 6,762,752 B2 | * | 7/2004 | Perski et al. | 345/173 |
| 7,088,347 B2 | * | 8/2006 | Iisaka et al. | 345/177 |
| 7,436,393 B2 | * | 10/2008 | Hong et al. | 345/173 |
| 2004/0104899 A1 | | 6/2004 | Hong et al. | |
| 2006/0279548 A1 | * | 12/2006 | Geaghan | 345/173 |

FOREIGN PATENT DOCUMENTS

| | | |
|---|---|---|
| JP | 61074025 | 9/1984 |
| JP | 10049301 | 8/1996 |
| JP | 2003233464 | 2/2002 |
| JP | 2006085489 | 9/2004 |

* cited by examiner

*Primary Examiner* — Jonathan Boyd
(74) *Attorney, Agent, or Firm* — Berenato & White, LLC

(57) ABSTRACT

A coordinate input device is provided. The coordinate input device includes a first input device for detecting a position input and obtaining a first input value indicate of the position, a second input device for detecting the position input and obtaining a second input value indicative of the position, the second input value having a tendency to be a more accurate indication of the position than the first input value, a determining unit configured to determine whether the first input device and the second input device simultaneously obtain the first input value and the second input value, respectively, a storing unit configured to store a relationship between the first input value from the first input device and the second input value from the second input device as correction information, and a correcting unit configured to correct the first input value on the basis of the correction information.

25 Claims, 5 Drawing Sheets

COORDINATE INPUT DEVICE

CROSS REFERENCES TO RELATED APPLICATIONS

The present invention claims priority from Japanese Patent Application JP 2006-336029 filed in the Japanese Patent Office on Dec. 13, 2006, the contents of which are incorporated herein by reference.

FIELD OF THE INVENTION

The present invention relates to a coordinate input device suitable for use with a digitizer in communication with a computer, or the like.

BACKGROUND OF THE INVENTION

A touch panel including a pressure-sensitive sensor corrects an input value and then obtains a corrected value to compensate for the deterioration of a resistive film that occurs when the touch panel is repeatedly used (for example, see Japanese Unexamined Patent Application Publication No. H5-250086).

For example, as shown in FIG. 1, a four-wire touch panel 102 has two sides, each made of a resistive film. One of the sides 104, i.e., a first side, is provided with electrodes 106 at both ends thereof in the direction of an X-axis and the other side 108, i.e., a second side, is provided with electrodes 110 at both ends thereof in the direction of a Y-axis. When the surface of the touch panel 102 is pressed, the resistive films on both of the sides are caused to contact each other where the surface is being pressed, thereby allowing the point of contact to be detected.

Specifically, when the resistive films on both the sides 104 and 108 are pressed into contact with each other as described above, a predetermined voltage is applied between the electrodes 106 at the both ends of the first side 104 for a period while the resistive films are in the contact state so that a voltage between the electrodes 110 on the second side 108 can be detected. During a subsequent period, a predetermined voltage is applied between the electrodes 110 at the both ends on the second side 108 so that a voltage between both the electrodes 106 on the first side 104 can be detected. From these detected voltages, an X-Y coordinate can be determined.

However, the touch panel 102 may have resistive films that are susceptible to variations in resistance values. In addition, when using the touch panel 102 described above in a typical fashion, contact points being pressed tend to be unevenly distributed. Therefore, deterioration of the resistive film may occur due to the wear and tear associated with repeated contact with certain points on the touch panel 102 may occur. Hence, a position input value is corrected to compensate for the deterioration of a resistive film, as disclosed in Japanese Unexamined Patent Application Publication No. H5-250086.

However, complicated signal processing may be necessary for such a correction, thereby requiring a user to perform a calibration operation. Therefore, a user is generally unable to perform the calibration operation should an error occur in an input coordinate.

In contrast, for a five-wire or eight-wire coordinate input device, for example, a touch panel that automatically corrects an input coordinate has been proposed. In this case, however, the configuration of the device and the production process thereof may become complicated because of an increase in the number of wires. Further, in order to automatically correct the input coordinate, complex computations are required. Thus, the automatic correction of an input coordinate for a 5 or 8 wire input device is difficult to implement.

On the other hand, an input device, such as an electromagnetic induction sensor, does not require correction of an input value to compensate for deterioration (see, for example, Japanese Unexamined Patent Application Publication No. H5-298007).

As shown in FIG. 2, an electromagnetic sensor 202 includes a plurality of loop coils 204 being arranged in X and Y directions. When a position indicator approaches any of these loop coils, a resonant circuit 206 incorporated in the position indicator resonates to compute an X-Y coordinate based on a resonance signal and a position of the loop coil selected by selector circuits 208. A coordinate-calculating circuit 210 calculates the coordinate of the input based on signals received from the selector circuits 208. Consequently, an input value (coordinate) does not need correction. However, in order to use the electromagnetic induction system described above, a specific position indicator is typically required. Thus, an input to the sensor 202 may not be made at any time without the position indicator.

Accordingly, there is a need for an improved input device that combines the position sensing functions of the electromagnetic induction system with the function of the touch panel.

SUMMARY OF THE INVENTION

The present invention provides a coordinate input device including a first input device for detecting a position input and obtaining a first input value indicative of the position and a second input device detecting the position input and obtaining a second input value indicative of the position. The second input value has a tendency to be a more accurate indication of the position than the first input value. The coordinate input device includes a determining unit configured to determine whether the first input device and the second input device simultaneously obtain the first input value and the second input value, respectively. The coordinate input device also includes a storing unit configured to store a relationship between the first input value from the first input device and the second input value from the second input device as correction information. The coordinate input device further includes a correcting unit configured to correct the first input value on the basis of the correction information.

The second input value from the second input device may be the correction information for the first input value from the first input device.

The correction information may be a parameter value when the first input value is calculated from a value obtained from the first input device.

The correction information may be a difference value between the first input value and the second input value.

The coordinate input device may further include a position indicator capable of simultaneous input to the first and second input devices. The coordinate input device may also include a display device operably associated with the first and second input devices. The display device displays instructions to input the first input value and the second input value using the position indicator within a range corresponding to at least one predetermined area of the first input device and the second input device.

The display device may be laid on the first input device and the second input device, and may display the at least one predetermined area.

The correction information may be stored in a correction table for each coordinate of the first input value each time the first input value and the second input value are simultaneously obtained.

The correction table may include a first correction table used for correcting the first input value and a second correction table for storing difference information between each coordinate of the first input value and each corresponding coordinate of the second input value. The difference information stored in the second correction table may be written into the first correction table at a predetermined time.

The parameter value may include a first parameter value used for correcting the first input value and a second parameter value stored each time the first input device and the second input device simultaneously obtain the first input value and the second input value, respectively. The first parameter value may be set to the second parameter value at a predetermined time.

The predetermined time may be determined by determining whether a predetermined amount of time has elapsed since the first parameter value was set to the second parameter value or determining whether an instruction of a user to set the parameter has been received or determining whether a system is in a startup mode.

The first input device may be a pressure-sensitive sensor and the second input device may be an electromagnetic-induction sensor.

The first input value may be detected by the pressure-sensitive sensor simultaneously with a detection of the second input value by the electromagnetic-induction sensor. An output of the electromagnetic-induction sensor may be compared with an output of the pressure-sensitive sensor to obtain the correction information.

A digitizer tablet having a pointing device is also provided. The digitizer tablet includes a first input device for sensing a first type of position input used to calculate a first input value, and a second input device operably associated with the pointing device. The second input device interacts with the pointing device for sensing a second type of position input used to calculate a second input value. A correction processing unit corrects the first input value based on a comparison between previous first and second input values received for the same position input by the first and second input devices, respectively. An output selecting unit selects the second input value to be output whenever the second type of position input is sensed and selects the first input value to be output whenever the second type of position input is not sensed.

A method and computer readable medium for controlling the coordinate input device and/or digitizer tablet are also provided.

BRIEF DESCRIPTION OF THE DRAWINGS

FIGS. 5A and 5B represent different procedures.

DESCRIPTION OF THE PREFERRED EMBODIMENT(S)

Figure 1:
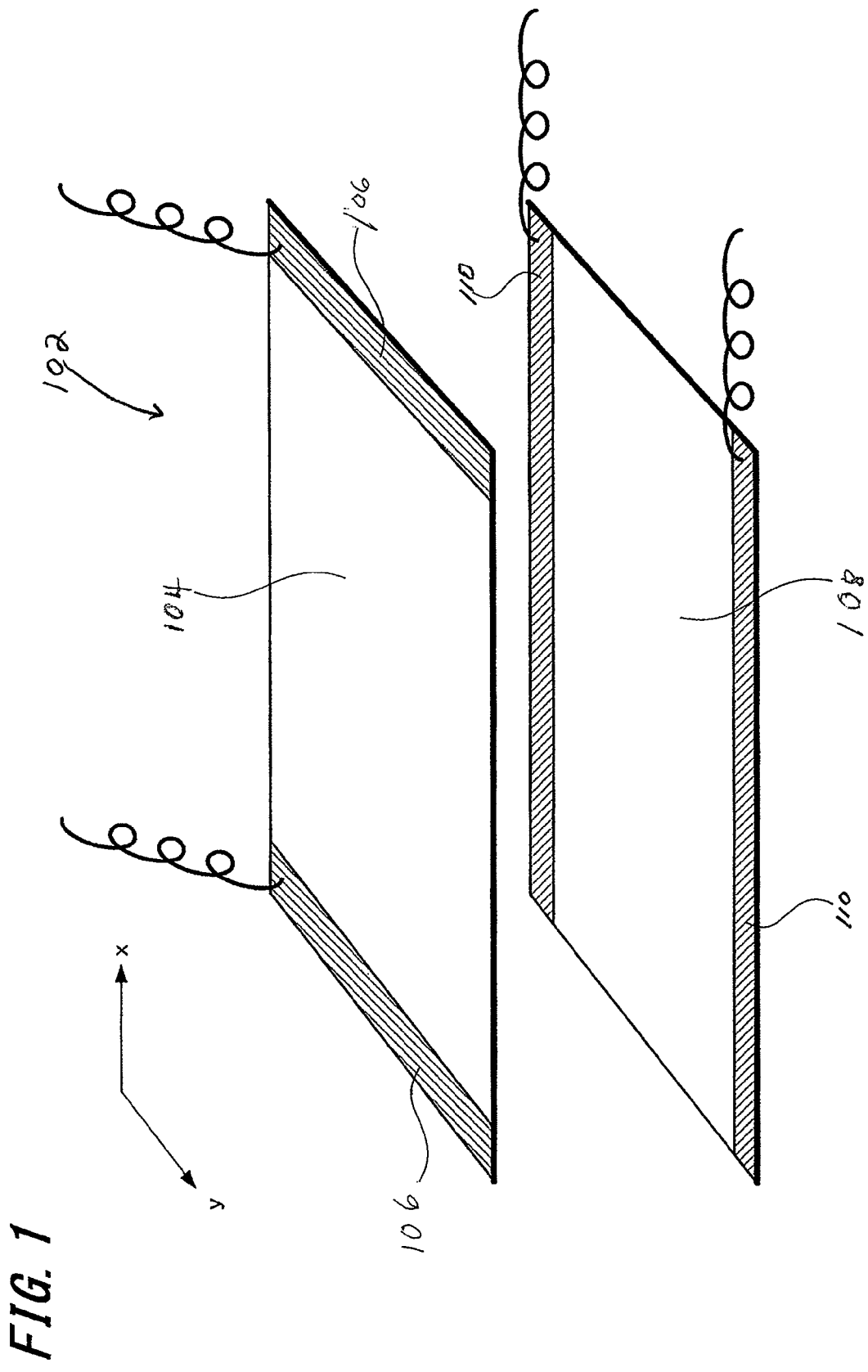
FIG. 1 is a schematic diagram illustrating a conventional touch panel.
Figure 2:
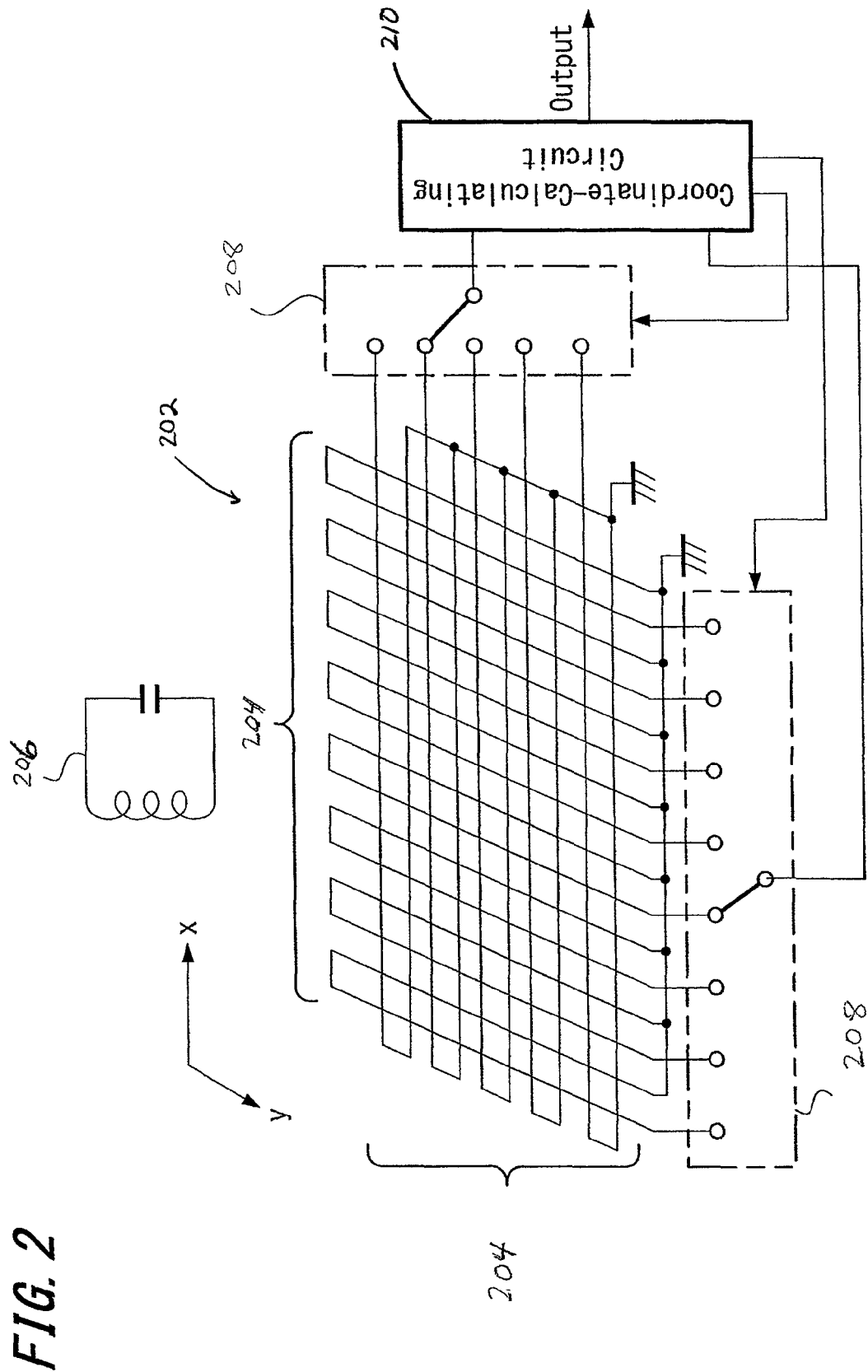
FIG. 2 is a schematic diagram illustrating a conventional electromagnetic-induction sensor.

Reference will now be made in detail to the embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in this section in connection with the preferred embodiments and methods. The invention according to its various aspects is particularly pointed out and distinctly claimed in the attached claims read in view of this specification.

Figure 3:
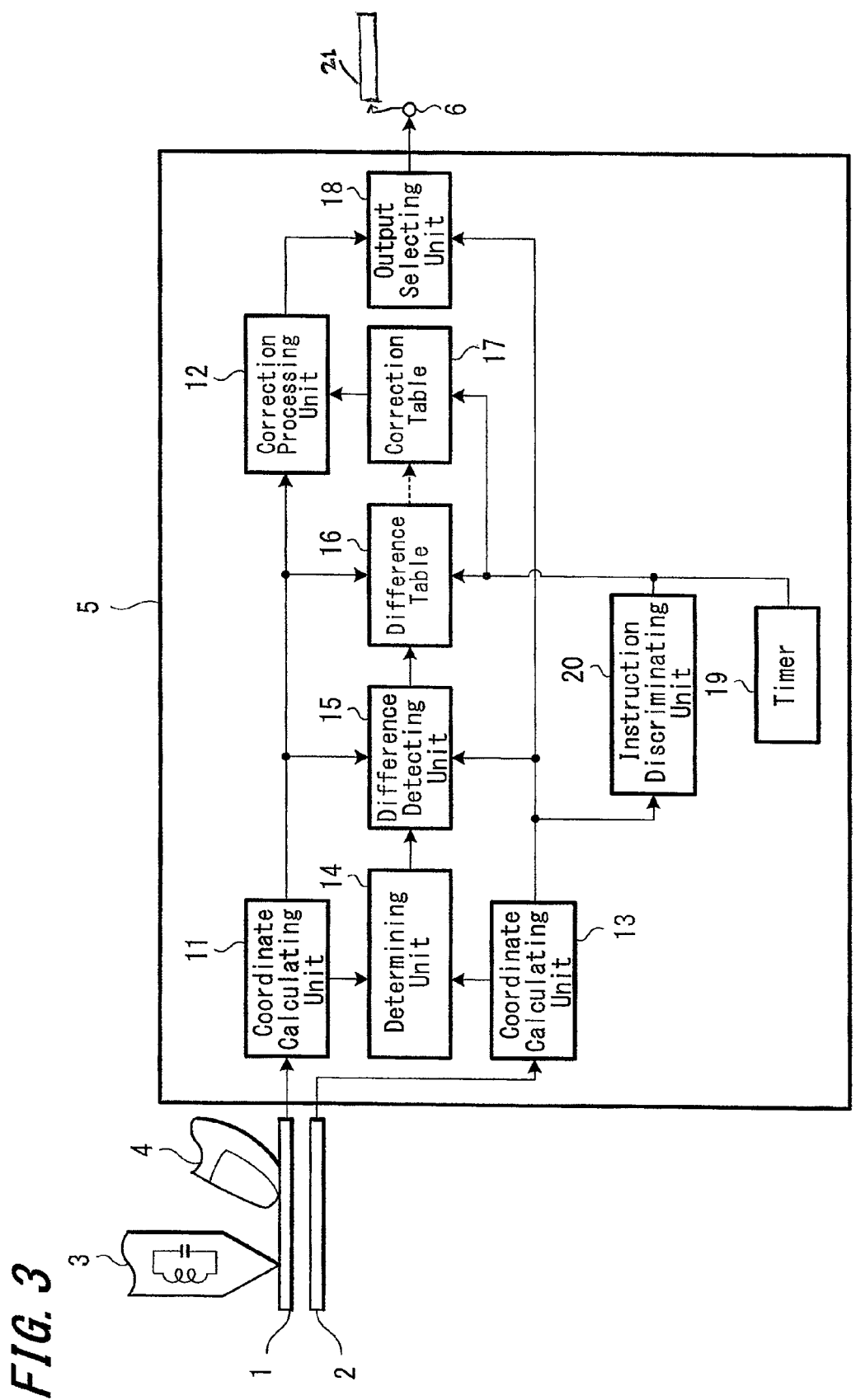
FIG. 3 is a block diagram illustrating a coordinate input device according to an embodiment of the present invention.

As best shown in FIG. 3, the coordinate input device includes: a first input device 1, such as a touch panel or pressure-sensitive sensor, which may produce an input value that is inaccurate and needs to be compensated or corrected for deterioration and/or other factors. That is, the first input device 1 may have a tendency to produce inaccurate data due to the age and repeated use of the device 1. The first input device may be similar to the touch panel described in Japanese Unexamined Patent Application Publication No. H5-250086. The coordinate input device further includes a second input device 2, such as an electromagnetic induction sensor, which may produce an input value that does not need to be corrected. That is, the second input device 2 produces accurate data and is not as much affected by age and repeated use as the first input device 1. The second input device 2 may be similar to the electromagnetic induction sensor described in Japanese Unexamined Patent Application Publication No. H5-298007. The touch panel 1 and the electromagnetic induction sensor 2 are stacked together. The touch panel 1 may be exposed on a position input side so that a user can contact the touch panel 1. The electromagnetic induction sensor 2 may be spaced apart from the position input side. In addition, a liquid crystal display or other display panel may be placed between the touch panel 1 and the electromagnetic induction sensor 2.

The touch panel 1 and the electromagnetic sensor 2 may interact with a position indicator 3 having a resonant circuit incorporated therein. The position indicator 3 may be a pen, stylus, puck or the like. In this case, both the touch panel 1 and the electromagnetic induction sensor 2 can detect an indicated position. However, the electromagnetic sensor 2 detects a coordinate more accurately than the touch panel 1, i.e., with a higher degree of accuracy. In contrast, when the tip of a user's finger 4 or other input device having no resonant circuit is used to input a position, a position is only detected by the touch panel 1, and not by the electromagnetic induction sensor 2.

The detection with the touch panel 1 tends to cause deterioration, i.e., caused by wear and tear associated with repeated use. As best shown in FIG. 3, an input value is supplied from the touch panel 1 to a central processing unit (CPU) 5 for coordinate calculation. The input value is converted into an input coordinate value by a coordinate calculating unit 11. Subsequently, the input coordinate value is supplied to a correction processing unit 12 to obtain a correct value to compensate for an inaccurate coordinate value caused by deterioration of the touch panel 1. In contrast, an input value obtained from the electromagnetic induction sensor 2 may not require correction, because the electromagnetic induction sensor 2 is not as susceptible to deterioration that results from repeated use. Thus, an input value supplied from the electromagnetic induction sensor 2 to the CPU 5 is then supplied to the coordinate calculating unit 13 and is converted into an input coordinate value with accuracy.

The coordinate calculating units 11, 13, respectively, generate signals indicating the input coordinate values of the touch panel 1 and the electromagnetic induction sensor 2. These signals are supplied to a determining unit 14, which determines whether both the inputs of the touch panel 1 and the electromagnetic induction sensor 2 are simultaneously received. Subsequently, a determining signal is supplied to a difference detecting unit 15 where the difference between the two sets of input coordinate values received from the coordinate calculating units 11, 13 is detected. Then, the difference value is supplied to a difference table 16, and is then stored according to the input coordinate value supplied from the coordinate calculating unit 11. That is, the difference between the two sets of input coordinate values are stored in association with the input coordinate value received from the touch panel 1.

Therefore, the difference table 16 stores the difference between the coordinate value calculated by the coordinate calculating unit 11, which may be inaccurate and need compensation or correction, and the coordinate value calculated by the coordinate calculating unit 13, which is accurate and does not need compensation or correction. Subsequently, the resulting difference value stored in the difference table 16 is then stored in a correction table 17. In the correction processing unit 12, the difference value retrieved from the correction table 17 is added to or subtracted from the coordinate value calculated by the coordinate calculating unit 11, which provides the input coordinate value of the touch panel 1. Accordingly, a correction procedure can be performed to correct the coordinate value calculated at the coordinate calculating unit 11 to compensate for deterioration of the touch panel 1.

Subsequently, either the coordinate value of the touch panel 1 corrected at the correction processing unit 12 or the coordinate value of the electromagnetic induction sensor 2 calculated at the coordinate calculating unit 13 is selected by an output selecting unit 18. The selected output is then provided as a coordinate output 6 from the CPU 5. More particularly, the output selecting unit 18 selects the coordinate value of the electromagnetic induction sensor 2 calculated by the coordinate calculating unit 13 whenever it is obtained and available. This selection ensures accurate position detection without correction. In contrast, the coordinate value of the touch panel 1 corrected by the correction processing unit 12 is selected by the output selecting unit 18 when the coordinate value of the electromagnetic induction sensor 2 calculated by the coordinate calculating unit 13 is not obtained. That is, the output from the electromagnetic induction sensor 2 is output when it is available, and the corrected output from the touch panel 1 is output when the output from the electromagnetic touch sensor 2 is not available. Consequently, a correct coordinate value is obtained at any time as the coordinate output 6 regardless of whether the position indicator 3 is being used.

A display device 21 may be associated with the touch panel 1 and the electromagnetic induction sensor 2. Although not shown in this manner in FIG. 3, the display device 21 may be a display panel, such as an LCD panel, interposed between the touch panel 1 and the electromagnetic induction sensor 2 or the display panel may be laid on the touch panel 1 and the electromagnetic induction sensor 2. Alternatively, the coordinate input device best shown in FIG. 3 may communicate with a separate display device 21 that is not integrated therewith. The coordinate input device best shown in FIG. 3 communicates with the display device 21 or display panel via the coordinate output 6 so that a user can received visual feedback about the position input to the coordinate input device.

Figure 4:
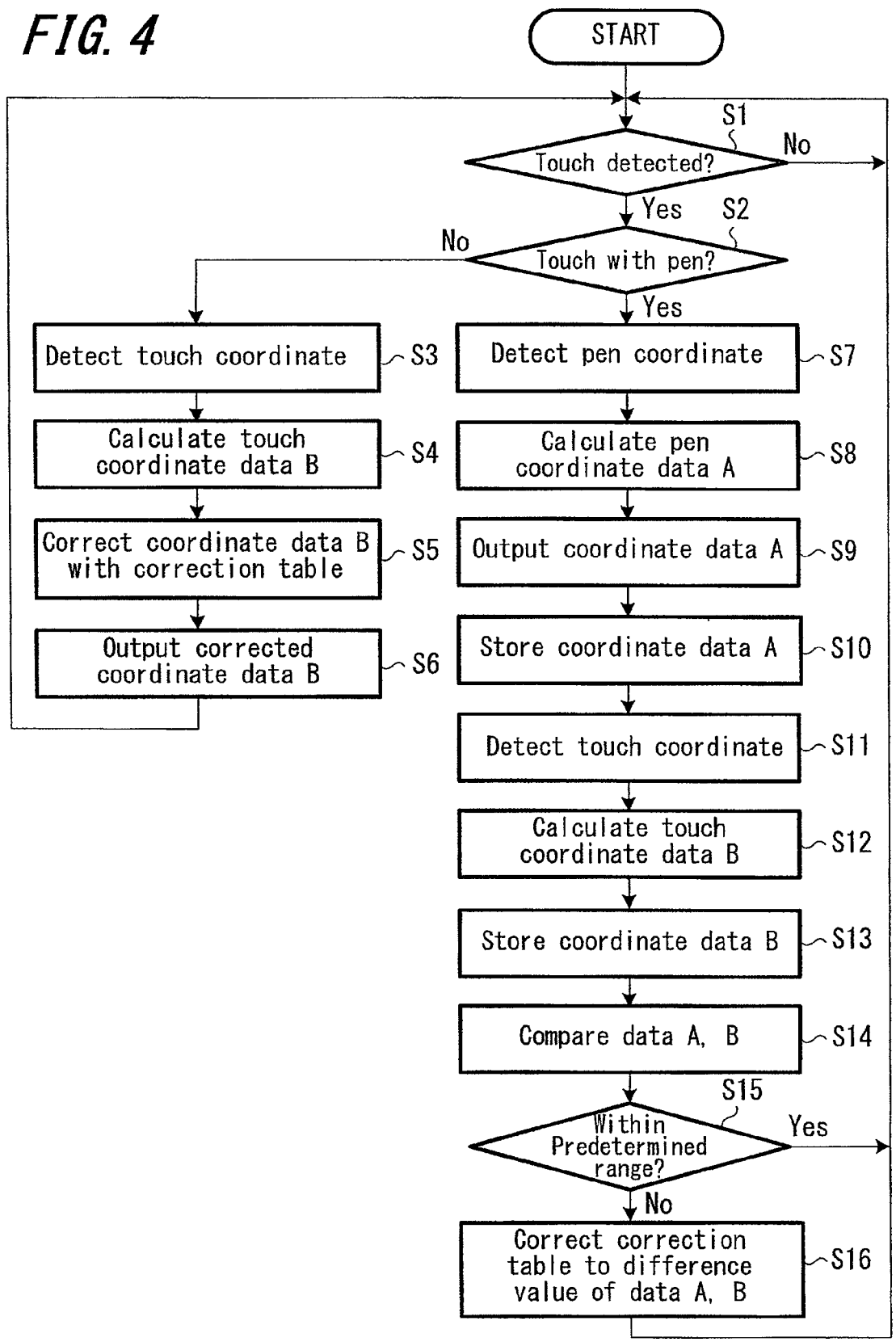
FIG. 4 is a flowchart illustrating operation of the coordinate input device of FIG. 3.

As best shown in FIG. 4, it is first determined whether the touch panel 1 or the electromagnetic induction sensor 2 is touched (Step S1). If there is no touch (NO), then step S1 is repeated. If a touch is detected (YES), then it is determined whether the touch is performed with the position indicator 3 (pen) having the resonant circuit (Step S2).

In step S2, if the position indicator 3 is not used (NO), then the coordinate of touch is detected (Step S3) and touch-coordinate data B is calculated (Step S4). The calculated coordinate data B is then corrected using the correction table 17 (Step S5). The corrected coordinate data B is then output (Step S6). These processing steps may be similar to those performed by a typical touch panel. Furthermore, after completing these steps, the process returns to Step S1.

If the position indicator 3 (pen) is used in Step S2 (YES), the coordinate of the position indicator 3 or pen is detected by the electromagnetic induction sensor 2 (Step S7). Then, pen coordinate data A is calculated (Step S8). The coordinate data A is output (Step S9) and stored (Step S10). These steps may be similar to those performed by a typical electromagnetic sensor. In the present embodiment, the following steps are subsequently performed.

After the coordinate data A is stored, the coordinate of the touch is detected (Step S11) by the touch panel 1. The touch coordinate data B is then calculated (Step S12) and stored (Step S13). Then, the stored coordinate data A and the coordinate data B are compared (Step S14). If the difference between the coordinate data A and the coordinate date B is within an allowable range (YES), then the process returns to Step S1. The acceptable range may be predetermined by programming or preset by a user.

On the other hand, if the difference between the coordinate data A and the coordinate data B is outside of the allowable range (NO) in Step S14, then the correction table 17 is revised using the new or updated difference value between the coordinate data A and the coordinate data B (Step S16). Then, the process returns to Step S1. Here, if the correction table 17 stores the difference value and correction is then performed by adding the difference value to the coordinate value detected by the touch panel 1 or by subtracting the difference value from the coordinate value detected by the touch panel 1, then the subsequent output of the touch panel 1 can be corrected.

Figure 5A:
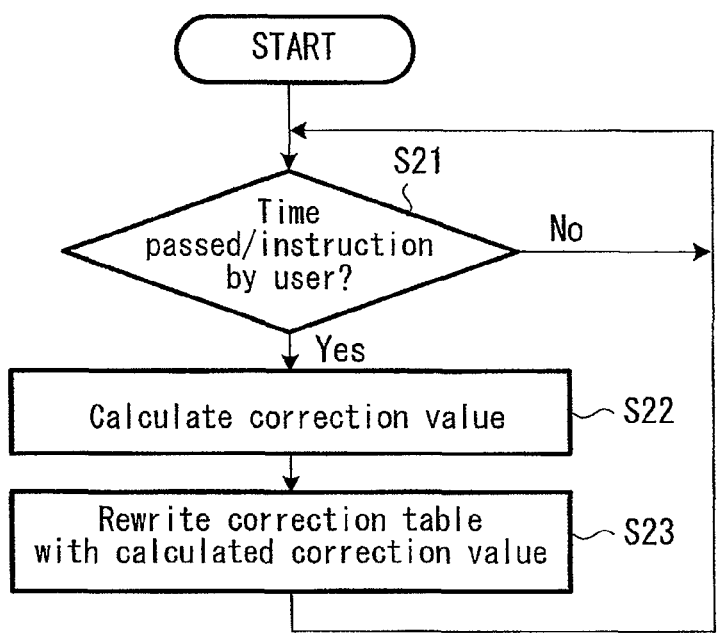
FIGS. 5A and 5B are flowcharts illustrating the operation of the coordinate input device, where
Figure 5B:
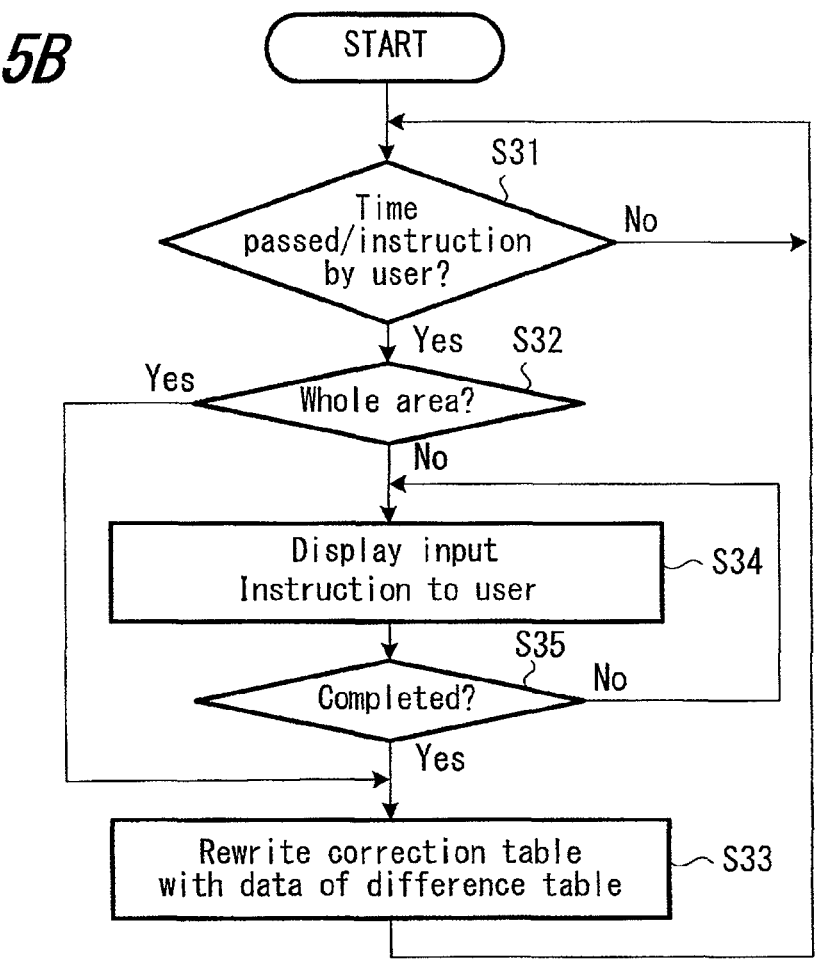

As best shown in FIG. 4, the correction table 17 is immediately rewritten when the difference between the coordinate data A and the coordinate data B exceeds the acceptable range. However, a frequent rewrite of the memory may be undesirable. Thus, as best shown in FIG. 3, the difference table 16 is provided together with a timer 19 and an instruction discriminating unit 20 for the user. The correction table 17 is rewritten after a predetermined amount of time has elapsed since the last time the correction table 17 was rewritten, or in accordance with the user's instruction to rewrite the correction table 17. FIGS. 5A and 5B illustrate these procedures.

Specifically, as best shown in the flowchart shown in FIG. 5A, it is first determined whether a predetermined amount of time has elapsed since the last time the correction table 17 was rewritten or whether the user has issued an instruction to rewrite the correction table 17 (Step S21). Here, if the predetermined amount of time has not elapsed or there is no instruction issued by the user (NO), then Step S21 is repeated. On the other hand, if it is determined that the time has elapsed or that the user has issued an instruction (YES), then a correction value is calculated using the data stored in the difference table 16 (Step S22) and the correction table 17 is then overwritten with the calculated correction value (Step S23).

In the flowchart illustrated in FIG. 5B, it is first determined whether a predetermined amount of time has elapsed since the last time the correction table 17 was rewritten or whether the user has issued an instruction to rewrite the correction table 17 in a manner similar to the determination in Step S21 shown in FIG. 5A (Step S31). Here, if the predetermined amount of time has not elapsed or there is no instruction by the user (NO), then Step S31 is repeated. On the other hand, if it is determined that the predetermined amount of time has elapsed or there is an instruction by the user (YES), then it is determined whether the data stored in the difference table 16 is overall data or corresponds to a whole area of a coordinate grid (Step S32). In other words, it is determined whether the difference table 16 has stored difference information for coordinate values extending across the entire coordinate grid of the touch panel 1 and the electromagnetic induction sensor 2.

If the data stored in the difference table 16 is the overall data in Step S32 (YES), the correction data stored in the difference table 16 overwrites the correction table (Step S33). On the other hand, if the data stored in the difference table 16 is not the overall data (NO), then a request for overall input with the touch panel 1 and the electromagnetic induction sensor 2 is displayed (Step S34). Here, the user is prompted to touch the touch panel 1 with the position indicator 3 over the entire area of the coordinate grid to obtain difference information for a large number of the coordinates in the grid.

Then, it is determined whether the overall input to the touch panel 1 and the electromagnetic induction sensor 2 is completed in response to the display (Step S35). If the overall input is not completed (NO), then Step S34 is repeated to continue prompting the user to contact the touch panel 1 with the position indicator 3 until each area of the coordinate grid has difference information associated therewith and stored in the difference table 16. If the overall input is completed (YES), then the correction table 17 is overwritten with the correction values stored in the difference table 16 in Step S33. In this manner, the correction table 17 is rewritten after a predetermined amount of time has elapsed since the last time the correction table 17 was rewritten or according to a user's instruction to rewrite the correction table 17. Additionally, all the values of the correction table 17 can be rewritten together, for example, when the coordinate input device is in a set up mode or initialization mode. As a result, correction information will be available in the correction table 17 for all input coordinate values in the coordinate grid.

As described above, according to the coordinate input device of the present embodiment of the invention, an input value from the first input device 1, which may require correction, can be performed automatically or semi-automatically using a simplified method.

In the present embodiment of the invention, the CPU 5 for the coordinate calculation is provided together with the touch panel 1 and the electromagnetic induction sensor 2. Alternatively, the coordinate input device may be configured such that output signals from the touch panel 1 and the electromagnetic induction sensor 2 can be directly input into a personal computer (not shown) and the CPU 5 for the coordinate calculation can be provided as a driver running on the personal computer.

Furthermore, in the present embodiment of the invention, the difference value is stored as correction information in the difference table 16 in accordance with the coordinate value from the coordinate calculation unit 11 associated with the touch panel 1. Alternatively, parameter values of an arithmetic expression for the correction at the correction processing unit 12 may be stored in advance.

An example of such parameter values will be described below.

If true coordinate values (values obtained from the electromagnetic induction sensor 2 in the present embodiment) are (EX1, EY1), (EX2, EY2) and coordinate values to be corrected (values obtained from the touch panel 1 in the present embodiment) are (RX1, RY1), (RX2, RY2), then correction parameters in the X axis and the Y axis are as follows:

$$INCL\ X = (EX2-EX1)/(RX2-RX1)$$

$$INCL\ Y = (EY2-EY1)/(RY2-RY1)$$

Storing such parameter values (INCL X) (INCL Y) allows the collection of the coordinate value with the touch panel 1. Consequently, the coordinate input device uses correction information, which is a parameter value, used in calculation of a corrected first input value from a value obtained from the first input device.

Furthermore, in the coordinate input device, the parameter values include a first parameter value to be used in correction of a first input value from the first input device and a second parameter value stored each time the first input device and the second input device simultaneously obtain a first input value and a second input value. The second parameter is overwritten on the first parameter value at a predetermined time. That is, the first parameter is set to be equal to the second parameter.

It will be appreciated by one of ordinary skill in the art that that the devices or the methods described above may be embodied as computer readable codes on a computer readable recording medium running on a digitizer tablet itself or as a system driver running on the host computer. The computer readable recording medium may be any data storage device that can store data, which can be thereafter read by a computer system. Examples of the computer readable recording medium include read-only memory (ROM), random-access memory (RAM), CD-ROMs, flash memory, downloadable instructions, magnetic tapes, floppy disks, optical data storage devices, and carrier waves (such as data transmission through the Internet), among other things.

Although embodiments of the present invention have been shown and described, it will be appreciated by those skilled in the art that changes may be made in these embodiments without departing from the principles and spirit of the invention, the scope of which is defined in the appended claims and their equivalents.

We claim:

1. A coordinate input device, comprising:
a pressure-sensitive sensor for detecting a coordinate position input defined by coordinates regardless of an amount of pressure imparted upon said pressure-sensitive sensor and obtaining a first input value indicative of the coordinate position input as detected by the pressure-sensitive sensor;
an electromagnetic-induction sensor for detecting the position input defined by coordinates and obtaining a second input value indicative of the position input as detected by the electromagnetic-induction sensor, the pressure-sensitive sensor and electromagnetic-induction sensor configured to permit simultaneous detection of the position input and to simultaneously obtain the first and second input values, the electromagnetic-induction sensor having a tendency to be a more accurate indication of the position input than the pressure-sensitive sensor;
a position indicator configured to simultaneously perform the position input on the pressure-sensitive sensor and the electromagnetic-induction sensor;
a determining unit configured to determine whether the position indicator performs the position input on the pressure-sensitive sensor and electromagnetic-induction sensor to simultaneously obtain coordinates of the first input value and the second input value, respectively;

a difference detecting unit to detect a difference value between the coordinates of the first input value and the second input value when the determining unit determines that the position indicator performs the position input on the pressure-sensitive sensor and electromagnetic-induction sensor to simultaneously obtain coordinates of the first input value and the second input value, respectively;

a storing unit configured to store the difference value as correction information; and a correcting unit configured to correct the first input value using the stored correction information, the corrected first input value used as the coordinate position input when the second input value is not obtained, wherein said storing unit updates the correction information in real time to account for degradation in performance of the pressure-sensitive sensor that occurs with repeated use of the pressure-sensitive sensor.

2. A coordinate input device according to claim 1, wherein the second input value comprises the correction information for the first input value.

3. A coordinate input device according to claim 1, wherein the correction information comprises a parameter value used to calculate the corrected first input value from a value obtained from the pressure-sensitive sensor.

4. A coordinate input device according to claim 1, wherein the correction information comprises a difference value between the first input value and the second input value.

5. A coordinate input device according to claim 1, further comprising:

a display operably associated with the pressure-sensitive sensor and the electromagnetic-induction sensor, the display displaying the position inputs detected by the pressure-sensitive sensor and the electromagnetic-induction sensor.

6. A coordinate input device according to claim 5, wherein the display device is situated on or over the pressure-sensitive sensor and the electromagnetic-induction sensor.

7. A coordinate input device according to claim 1, wherein the correction information is stored in a correction table for each coordinate of the first input value each time the first input value and the second input value are simultaneously obtained.

8. A coordinate input device according to claim 7, wherein the correction table includes a first correction table for correcting the first input value and a second correction table for storing difference information between each coordinate of the first input value and each corresponding coordinate of the second input value, and the difference information stored in the second correction table is written into the first correction table at a predetermined time.

9. A coordinate input device according to claim 3, wherein the parameter value includes a first parameter value for correcting the first input value and a second parameter value stored each time the pressure-sensitive sensor and the electromagnetic-induction sensor simultaneously obtain the first input value and the second input value, respectively, and the first parameter value is set to the second parameter value at a predetermined time.

10. A coordinate input device according to claim 9, wherein the predetermined time is determined by determining whether a predetermined amount of time has elapsed since the first parameter value was last set to the second parameter value or determining whether an instruction of a user to set the parameter has been received or determining whether a system is in startup mode.

11. A coordinate input device according to claim 1, wherein:

an output of the electromagnetic-induction sensor is compared with an output of the pressure-sensitive sensor to obtain the correction information.

12. A coordinate input device according to claim 1, wherein said first and second input devices are stacked on top of each other.

13. A coordinate input device according to claim 1, wherein stored correction information is updated in accordance with user-defined criteria.

14. A digitizer tablet comprising:

a pointing device;

a first input device including a pressure-sensitive sensor for sensing a first type of position input used to calculate a first input coordinate value regardless of a pressure imparted upon said pressure-sensitive sensor;

a second input device including a electromagnetic-induction sensor in electromagnetic communication with the pointing device to interact with the pointing device for sensing a second type of position input used to calculate a second input coordinate value simultaneously with said first input device sensing said first type of position input, the first type of position input being different than the second type of position input;

a difference detecting unit configured to detect a difference value between the first input coordinate value and the second input coordinate value when the first and second types of position input are sensed simultaneously;

a storing unit configured to store the difference value as correction information; and a correction processing unit for correcting the first input coordinate value based on the stored correction information, the corrected first input coordinate value used as the coordinate position input when the second input coordinate value is not obtained, wherein said correction processing unit corrects the first input coordinate value to compensate for inaccuracies in the first input coordinate value due to wear on said pressure-sensitive sensor.

15. A digitizer tablet according to claim 14, wherein said first input device comprises a touch panel.

16. A digitizer tablet according to claim 14, further comprising:

a correction table for storing correction information for adjusting various first input coordinate values to be closer to corresponding second input coordinate values for the same position input, said correction table being accessible by said correction processing unit.

17. A digitizer tablet according to claim 14, further comprising:

a correction table for storing correction information for adjusting various first input coordinate values to be closer to corresponding second input values for the same position input, said correction table being accessible by said correction processing unit;

a difference detecting unit for determining a difference between the first and second input coordinate values whenever the first and second input devices simultaneously detect the pointing device; and a difference table for storing recent difference values between the first and second input coordinate values and for updating the correction information of said correction table whenever a predetermined event occurs.

18. A digitizer tablet according to claim 17, wherein the predetermined event comprises one of an expiration of a time period, receipt of an update instruction from a user, and a comparison between the first and second input coordinate values as being outside a predetermined range defined by the difference value stored in said difference table in association with a current first input coordinate value.

19. A digitizer tablet according to claim 14, wherein said electromagnetic induction sensor includes a plurality of inductive coils for electromagnetic interaction with a resonant circuit in the pointing device.

20. A digitizer tablet according to claim 14, wherein stored correction information is updated in accordance with user defined criteria.

21. A method of detecting a coordinate input on a digitizer tablet having first and second input devices of differing degrees of accuracy, the method comprising the steps of:
- detecting a position input defined by coordinates using the first input device including a pressure-sensitive sensor for obtaining a first input value indicative of the position input regardless of a pressure imparted to said pressure-sensitive sensor;
- detecting the position input defined by coordinates using the second input device including an electromagnetic-induction sensor simultaneously with said step of detecting said position input using the first input device and obtaining a second input value, the second input value having a tendency to be a more accurate indication of the position than the first input value;
- determining whether the first input device and the second input device simultaneously obtain the first input value and the second input value, respectively;
- detecting a difference value between the coordinates of the first input value and second input value when it is determined that first input device and the second input device simultaneously obtain the first input value and the second input value, respectively;
- storing the difference value as correction information;
- correcting the first input value using the correction information, the corrected first input value used as the coordinate position input when the second input value is not obtained, and
- updating the correction information in real time to account for degradation in performance of the pressure-sensitive sensor that occurs with repeated use of the pressure-sensitive sensor.

22. The method according to claim 21, wherein the storing of the relationship between the first input value and the second input value comprises:
- determining a difference between the first and second input values;
- storing recent difference values between the first and second input values for a simultaneous detection of the position input; and
- updating the stored correction information with the recent difference values in real time whenever a predetermined event occurs.

23. The method according to claim 22, wherein the updating of the correction information whenever the predetermined event occurs comprises updating the correction information whenever an expiration of a time period occurs, an update instruction is received from a user, or a comparison between the first and second input values is determined to be outside a predetermined range defined by a current difference value stored in association with the obtained first input value.

24. A method of detecting a coordinate input on a digitizer tablet according to claim 21, further comprising the step of positioning said first and second input devices to be stacked on top of each other prior to said steps of detecting.

25. A method according to claim 21, wherein stored correction information is updated in accordance with user defined criteria.

* * * * *